Patented July 13, 1937

2,087,096

UNITED STATES PATENT OFFICE 2,087,096

RESINOUS COMPOSITION

Moyer M. Safford, Schenectady, N. Y., assignor to General Electric Company, a corporation of New York No Drawing. Application May 25, 1932
Serial No. 613,563

4 Claims. (Cl. 106—22)

The present invention relates broadly to resinous compositions and more specifically to resinous composition of the alkyd type. It is particularly concerned with alkyd resins which are flexible, resilient and elastic in character and which are capable of being extruded or molded into various shapes and forms.

As is well known, alkyd resins include all those complexes resulting primarily from the interreaction of a polyhydric alcohol, such as glycerine, and a polybasic acid, such as phthalic acid or its anhydride. Perhaps the most common example of an alkyd resin is the resin formed by the reaction of glycerine with phthalic anhydride. Such a resin is usually hard and brittle in character.

Alkyd resins which are permanently flexible have been produced and are described and claimed in the copending application of Kienle and Rohlfs, Serial No. 393,119, filed September 16, 1929 now Patent 1,897,260 dated Feb. 14, 1933 and assigned to the same assignee as the present invention. Such resins may be prepared in various degrees of flexibility. Briefly, the resins are prepared by reacting suitable proportions of dibasic aliphatic acid, for example succinic acid, adipic acid and the like, and dihydric alcohol, such as ethylene glycol, with the usual alkyd resin ingredients, namely a polyhydric alcohol having preferably three or more hydroxyl groups in the molecule, for instance, glycerol, and a polybasic aromatic acid, such as phthalic acid or its anhydride. By varying the ratio of dibasic aliphatic acid-dihydric alcohol ester to polyhydric alcohol-polybasic aromatic acid ester in the reaction mass, the degree of flexibility of the resinous compositions may be varied. Increasing, for example, the ratio of the former to the latter, increases the flexibility of the resulting resin.

Such flexible alkyd resins as previously described do not lend themselves to extrusion under pressure, for example, in a heated die. For the manufacture of such articles as conduits, tubing and even solid cross sectional pieces it is often highly advantageous from a practical standpoint to be able to extrude the composition through a die.

In accordance with my discovery I can produce alkyd resin compositions which are flexible, resilient, elastic and plastic in nature, which lend themselves to extrusion through dies and which are moldable.

I have discovered that if the flexible alkyd resins prepared in accordance with the procedure described and claimed in the aforementioned Kienle et al. patent are compounded in a certain way it is possible to obtain compositions which are extrudable and moldable and which when shaped and cured permanently retain the form imparted thereto and remain at the same time flexible, resilient and elastic in nature.

If a resin of the Kienle et al. type (which is herein termed flexible alkyd resin) is taken in the semi-cured state and worked between heated rolls, such as ordinary rubber compounding rolls, in the presence of a plasticizer, the gel structure of the composition may be broken down and a composition is obtained which can be extruded but which deforms or loses its shape out of the die unless a certain amount of filler, such as mineral filler is present. The disadvantage attending the use of such filler in the composition resides in the fact that the mass becomes stiff and hard and tends to lose its flexibility, resiliency and elasticity.

I have found that if a certain proportion of the totally cured flexible resin is employed as the filler for the flexible resin in the uncured or semi-cured state, I get a composition which extrudes readily and keeps its shape after extrusion. Moreover, the products so obtained retain their flexibility, resiliency and elasticity. At the same time due to the fact that part of the resin is already in the cured state the composition is faster curing in character. In addition, I find that such products show improved electrical and mechanical properties. And, I also find that if I add to the mixture a basic substance such as zinc oxide, I materially hasten the cure of the composition, obviate the tendency for any bubbles to form in the mass and obtain still further improvements in dielectric strength and physical properties of the material.

In order to illustrate my invention but in no way limiting it I shall describe the preparation of resinous compositions produced in accordance therewith more in detail.

Glycerine, phthalic anhydride, ethylene glycol and succinic acid are taken in proportions such that the ratio of glycol succinate to glycerol phthalate is 4:1. The ingredients are heated together in an aluminum or other suitable vessel to a temperature of 180° to 200° C. until there is evidence of gelation. The melt is then poured into shallow amalgamated tins and cured at about 150° C. or higher from about three to five weeks. The cured resin is tough, resilient and exceedingly flexible under all conditions. Instead of allowing the mass to cure as above, the cure may be materially hastened if the reacted mass is worked in heated mixing apparatus such as a double arm dough mixer. In this way I have been able to reduce the time of cure to about eight hours.

The same mixture of original ingredients are reacted as above, the cure being carried along for about 15 to 20 hours in pans or for about forty minutes after gelation in the dough mixer, the temperature in each case being about 150° C. This resin is in the semi-cured state.

About 75% by weight of the completely cured resin ground to a flour-like consistency is mixed with about 25% of the semi-cured resin. This mixture lends itself to extrusion through heated dies into such shapes as tubing, covering for wire, etc., and to molding under heat and pressure. The mix cures in a relatively short time.

A batch of cured-uncured resin was prepared as above using the following ingredients: glycerine, phthalic anhydride, glycol and adipic acid, the proportions being chosen so that the ratio of glycol adipate to glycerol phthalate in the mass was 2.5 to 1. A small proportion of zinc oxide was added to the batch which was composed as follows:

| | Per cent |
|---|---|
| Cured resin | 75 |
| Semi-cured resin | 23 |
| Zinc oxide | 2 |

The mixture was worked on the compounding rolls, pressed into several flat sheets about 6 inches square by $\frac{1}{16}$ inch thick and cured at 140° C. for varying lengths of time, from one hour to 46 hours. The products were exceedingly tough mechanically. When folded and hammered on the creases the material did not crack. It was practically impossible to tear the material with the bare hands. The measured tensile strength was well over 2000 pounds per square inch increasing with the time of cure up to a certain point.

The products were noticeably free from bubbles and cracks. The dielectric strength was about 500 volts per mil. Corona tests compared with the best corona-proof rubber obtainable showed the rubber to crack and lose its life after about 48 hours in intense corona, whereas the alkyd resin products of the same thickness were not harmed. In place of zinc oxide other basic materials such as barium oxide, litharge, and the like may be used.

The product may be obtained in various degrees of plasticity and flexibility. This may be accomplished by varying, as described above, the ratio of dibasic aliphatic acid-dihydric alcohol ester to polyhydric alcohol-polybasic aromatic acid ester. Successful combinations, depending on the use to which the product is to be put, may be made with ratios varying between the approximate limits 2:1 to 15:1, the latter being an extremely plastic product.

Because of the good electrical and mechanical properties possessed by the products of my invention, it has been possible to apply it practically in the electrical art. It is employed in the manufacture of electrical cables by extruding the composition directly over metallic electrical conductors and replacing rubber where oil resistance and high dielectric strength are required. Electrical wires have been covered with the compositions of my invention, the extruded coatings ranging from $\frac{1}{16}$ inch thickness to $\frac{1}{2}$ inch in thickness. There appears to be no limitation to the thickness of the material extruded on the wire. The process is similar to that employed in using rubber to cover conductors with the exception that the curing of the composition takes place in dry heat, for example in an electrical oven instead of in an open steam oven. The covered wire lends itself very well to curing in talced pans as is done with rubber covered wire.

The electrical strength of the resin covered wire ranges from about 380 volts per mil to approximately 500 volts per mil, depending on the thickness of the walls. The covered wires when properly cured show less than 1% increase in weight when immersed in water for a period of 96 hours at room temperature. Oil tests for the same period of time and at the same temperature using a solution of 50% machine oil, 50% kerosene, and also a solution of 25% kerosene and 75% gasoline, showed absolutely no swelling of the cured composition immersed therein.

Another application of the products of my invention is in the extrusion of tubing. Tubes $\frac{1}{8}$ inch in diameter up to $4\frac{1}{2}$ inches in diameter have been extruded with various wall thicknesses. There appears to be no limitation to the diameter and length of the tubing which can be made. It presents advantages over varnished cambric tubing in that it is tougher, can be made in any desired length, and is less inflammable. The extruded resinous tubing has all the mechanical and electrical properties of the resinous covered wire described above.

It has also been possible to use the compositions of my invention to manufacture tape. The tape is made by extruding the material through a proper die, talcing and curing it. In one instance a tape one inch wide and 13 mils thick was extruded, talced and cured. Its dielectric strength was found to be about 1050 volts per mil.

It is possible to extrude the alkyd resin compositions of the present invention in various forms and shapes. Nor is it always necessary to extrude the material; it may be molded under heat and pressure. In molding the material care must be taken to permit the escape of the gases generated during curing. Such articles as wide sheets, oil-proof gaskets and the like may be made by a molding, extrusion or calendering operation.

It is desirable to mold armature coils in a solid bar thus doing away with the necessity of taping and impregnating and at the same time have a coil that is tough and flexible and one which has considerably higher heat conductivity than present coils. By utilizing the following method and compositions of my invention improved coils can be made.

First, a definite size coating of the alkyd resin composition is extruded on the wire and cured, the thickness of the coating being governed by the amount of insulation desired. Second, after the curing takes place and the desired space factor is obtained a second coating of the resin is extruded over the cured covering. The wire then remains in this condition until it is wound into coils.

After the wire has been wound into coils it is placed in a mold where it is pressed into a solid mass of the correct size and shape, all interstices having become filled with the composition while under pressure. The coil is then removed from the mold and allowed to cure for 6 to 12 hours in an oven at 140° C. When removed, it is found to be a tough, semi-flexible coil with high dielectric strength and oil- and water-proof.

The properties of the compositions of my invention may be varied or modified by the addition of suitable fillers and accelerators the same as used with rubber.

The proportions of cured to uncured resin employed in the mixture may be varied throughout a wide range. The ratio of the two types of resin to be used in the composition depends entirely on the application to which it is to be put. While not restricting myself to this range, I wish to indicate that for the purposes to which I have so far put my compositions to use I have found that the range of cured resin may vary between approximately 60 to 80% and the range of uncured resin may vary between approximately 20 to 40%.

It is to be understood that I do not confine myself to the specific ingredients mentioned herein in the manufacture of the resinous compositions of my invention. Various dibasic aliphatic acids may be used; for example, succinic, malic, maleic, fumaric, glutaric, adipic, pimelic, suberic, azelaic, sebacic acids and the like. As dihydric alcohols, ethylene glycol, diethylene glycol, propylene glycol, tetramethylene glycol and the like may be used. Other resin forming polybasic acids besides phthalic may be used, and polyhydric alcohols other than glycerine, especially those having three or more hydroxyl groups in the molecule, may be employed, for example, mannitol, pentaerythritol and the like.

This application is a continuation in part of my copending application, Serial No. 562,353, filed September 11, 1931.

What I claim as new and desire to secure by Letters Patent of the United States, is,—

1. The method of making an oil-resistant, extrudable resinous composition which is permanetly flexible, elastic and plastic which comprises mixing 60 to 80% by weight of totally cured comminuted flexible alkyd resin with 20 to 40% by weight of uncured comminuted flexible alkyd resin.

2. A permanently flexible, elastic and plastic composition which is capable of being extruded and shaped under heat and pressure comprising a mixture of 60 to 80% by weight of comminuted fully cured infusible flexible alkyd resin and 20 to 40% by weight of a flexible alkyd resin in a semi-cured state, said resins constituting the reaction products of a polybasic organic aromatic acid, a polyhydric alcohol having three or more hydroxyl groups in the molecule, a dibasic aliphatic acid and a dihydric alcohol.

3. An oil-resistant, extrudable resinous composition which is permanently flexible, elastic and plastic, comprising a mixture of 60 to 80% by weight of totally cured discrete particles of infusible, flexible alkyd resin and 20 to 40% by weight of a flexible alkyd resin in a semi-curved state.

4. The process which comprises thoroughly mixing in comminuted condition 60 to 80% by weight of a fully cured infusible, flexible alkyd resin with 20 to 40% by weight of a flexible alkyd resin in a semi-cured state and heating said mixture to cause said semi-cured flexible alkyd resin to bind said infusible resin into a uniform, elastic, flexible resinous composition.

MOYER M. SAFFORD.